United States Patent
Wu et al.

(10) Patent No.: US 9,522,515 B2
(45) Date of Patent: Dec. 20, 2016

(54) ADHESIVES DERIVED FROM AGRICULTURAL PROTEINS

(75) Inventors: Jianping Wu, Edmonton (CA); Chanchan Wang, Edmonton (CA)

(73) Assignee: THE GOVERNORS OF THE UNIVERSITY OF ALBERTA, Edmonton, Alberta (CA)

( * ) Notice: Subject to any disclaimer, the term of this patent is extended or adjusted under 35 U.S.C. 154(b) by 27 days.

(21) Appl. No.: 14/126,321

(22) PCT Filed: Jun. 18, 2012

(86) PCT No.: PCT/CA2012/000587
§ 371 (c)(1),
(2), (4) Date: Feb. 5, 2014

(87) PCT Pub. No.: WO2012/171109
PCT Pub. Date: Dec. 20, 2012

(65) Prior Publication Data
US 2014/0154516 A1   Jun. 5, 2014

Related U.S. Application Data

(60) Provisional application No. 61/498,311, filed on Jun. 17, 2011.

(51) Int. Cl.
*C08L 89/00* (2006.01)
*C08H 1/00* (2006.01)
(Continued)

(52) U.S. Cl.
CPC ............ *B32B 21/08* (2013.01); *C08H 1/00* (2013.01); *C08L 97/02* (2013.01); *C09H 3/00* (2013.01);
(Continued)

(58) Field of Classification Search
None
See application file for complete search history.

(56) References Cited

U.S. PATENT DOCUMENTS 2,648,659 A   8/1953   Spence et al.
2,668,154 A   2/1954   Orth
(Continued)

FOREIGN PATENT DOCUMENTS

CA   2458631   6/2003
CA   2666510   5/2008
(Continued)

OTHER PUBLICATIONS

Hull, W.Q.; Animal Glue; Ind. Eng. Chem.; 1952; 44(10); pp. 2275-2284; Oct. 1952.
(Continued)

*Primary Examiner* — Peter A Salamon
(74) *Attorney, Agent, or Firm* — Bennett Jones LLP

(57) ABSTRACT

The invention is directed to adhesives derived from animal or plant proteins, particularly canola and spent hen proteins. The adhesives are prepared by extracting the proteins by pH shifting; and either treating the extracted proteins with urea or sodium dodecyl sulfate, or polymerizing the proteins to form a protein-polymer conjugate. The invention is also directed to a wood based product comprising pieces of wood based material joined or consolidated with the adhesives.

17 Claims, 6 Drawing Sheets

(51) Int. Cl.
  C09J 189/00 (2006.01)
  B32B 21/08 (2006.01)
  C09H 3/00 (2006.01)
  C09J 189/04 (2006.01)
  C08L 97/02 (2006.01)
  C09J 151/08 (2006.01)
  C08F 283/04 (2006.01)

(52) U.S. Cl.
  CPC ............. *C09J 151/08* (2013.01); *C09J 189/00* (2013.01); *C09J 189/04* (2013.01); *C08F 283/04* (2013.01); *Y10T 428/31515* (2015.04)

(56) References Cited

U.S. PATENT DOCUMENTS

| | | | |
|---|---|---|---|
| 4,607,089 A | | 8/1986 | Riley et al. |
| 4,842,767 A | * | 6/1989 | Warschewski ..... C11D 3/38663 435/188 |
| 5,262,525 A | | 11/1993 | Bonnaffe et al. |
| 5,611,882 A | * | 3/1997 | Riebel ..................... C08L 97/02 156/244.11 |
| 5,942,058 A | | 8/1999 | Sleeter et al. |
| 6,291,559 B1 | | 9/2001 | Krinski et al. |
| 6,497,760 B2 | | 12/2002 | Sun et al. |
| 6,992,172 B1 | | 1/2006 | Chang et al. |
| 7,345,136 B2 | | 3/2008 | Wescott et al. |
| 7,416,598 B2 | | 8/2008 | Sun et al. |
| 8,309,159 B2 | * | 11/2012 | Lotz ........................... A23J 1/14 426/656 |
| 2001/0031307 A1 | * | 10/2001 | Krestel-Rickert ..... A23K 1/106 426/644 |
| 2003/0148084 A1 | | 8/2003 | Trocino, Sr. |
| 2006/0292284 A1 | * | 12/2006 | Irwin ......................... A23J 3/16 426/634 |
| 2009/0169867 A1 | * | 7/2009 | Kelly ...................... C08L 89/00 428/326 |
| 2009/0170978 A1 | * | 7/2009 | Kelly ......................... C08L 3/02 524/9 |
| 2010/0089287 A1 | | 4/2010 | Thames et al. |
| 2014/0316117 A1 | * | 10/2014 | Bressler ................... C08H 1/00 530/407 |

FOREIGN PATENT DOCUMENTS

| | | |
|---|---|---|
| CN | 1618914 | 5/2005 |
| ES | 2192134 | 9/2003 |
| GB | 2207137 | 1/1989 |
| JP | 1135357 | 5/1989 |
| WO | 02072723 | 9/2002 |
| WO | 03011894 | 2/2003 |

OTHER PUBLICATIONS

Blachford, E.S.L.; Glue—How Products are Made; Gale Cengage; 2002; vol. 5; eNotes.com; Retrieved Jul. 24, 2012; www.enotes.com/glue-66428-reference.

Browne, F.L. et al.; Water-Resistant Animal Glue; Ind, Eng. Chem.; 1927; 19(2): pp. 215-219; Feb. 1927.

Cheng, E. et al.; Adhesive properties of modified soybean flour in wheat straw particleboard. Composites: Part A 35 (2004) 297-302.

Ciannamea, E.M. et al.; Medium-density particleboards from modified rice husks and soybean protein concentrate-based based adhesives. J. Bioresource Tech. 2010; 101:818-825.

Frihart, C.R. et al. Adhesives with wood materials bond formation and performance. General Technical Report FPL-GTR-190.

Huang, W. and Sun, X. Adhesive properties of soy proteins modified by sodium dodecyl sulfate and sodium dodecylbenzene sulfonate. J. Amer. Oil Chem. Soc. 2000; 77:705-708.

Huang, W. et al. Adhesive properties of soy proteins modified by urea and guanidine hydrochloride. J. Amer. Oil Chem. Soc. 2000; 77:101-104.

Konno, T. et al. Urea-induced conformational changes in cold- and heat-denatured states of a protein, Streptomyces subtilisin inhibitor. Protein Science 1997, 6:2242-2249.

Lin, H. et al. Cow blood adhesive: Characterization of physicochemical and adhesion properties. Int. J. Adhesion and Adhesives 2010, 30:139-144.

Liu, D. et al. Biomimetic soy protein nanocomposites with calcium carbonate crystalline arrays for use as wood adhesive. Bioresource Tech. 2005, 101:6235-6241.

Liu, Y. et al. Development and characterization of adhesives from soy protein for bonding wood. Inter. J. Adhesion & Adhesives 2007, 27:59-67.

Liu, W. et al. Modification of soy protein plastic with functional monomer with reactive extrusion. J. Polymer Environment 2008, 16:177-182.

Mo, X. et al. Thermal properties and adhesion strength of modified soybean storage proteins. J. Amer. Oil Chem. Soc. 2004, 81:395-400.

Mo, X. et al. Thermal and mechanical properties of plastics molded from urea-modified soy protein isolates. J. Amer. Oil Chem. Soc. 2000, 78:867-872.

Mo, X. et al. Effects of molding temperature and pressure on properties of soy protein polymers. J. Appl. Polymer Sci. 1999, 73:2595-2602.

Nordqvist, P. et al. Comparing bond strength and water resistance of alkali-modified soy protein isolate and wheat gluten adhesives. Int. J. Adhesion & Adhesives 2010, 30:72-79.

Northen, M.T. et al. A batch fabricated biomimetic dry adhesive. Nanotechnology 2005, 16:1159-1166.

Ochi, M. et al. Bonding properties of epoxy resins containing two mesogenic groups. J. Applied Polymer Science 2004, 92:3721-3729.

Park, S.K. et al. Protein concentrate and adhesives from meat and bone meal. J. Amer. Oil Chem. Soc. 2000, 77:1223-1227.

Pizzi, A. Recent developments in eco-efficient bio-based adhesives for wood bonding: opportunities and issues. J. Adhesion Sci. Tech. 2006, 20:829-846.

* cited by examiner

ADHESIVES DERIVED FROM AGRICULTURAL PROTEINS

FIELD OF THE INVENTION

The invention relates to adhesives derived from agricultural proteins, and canola and spent hen proteins in particular.

BACKGROUND OF THE INVENTION

Adhesives are widely used in industry, for example, in the production of plywood and particleboard, and labeling, packaging, sizing and other applications. The technologies for the production of protein-based adhesives progressed significantly in the 1920's when the consumption and technical refinements of these adhesives were at their peak, but were replaced by petroleum-based adhesives in the 1960's. Petroleum-based adhesives have many advantages including strength and high water resistance. However, the emission of formaldehyde from processing, the presence of carcinogenic components in petroleum-derived synthetic adhesives, and the limited resources of petroleum have driven the wood industry to investigate alternative types of adhesives. This renewed interest has led to the development of adhesives based on soy protein for various commercial applications.

Agriculture generates millions of tons of protein-containing byproducts or waste annually. For example, in the poultry industry, hens nearing the end of their productive lives (i.e., "spent hens") are of little economic value and considered as byproducts requiring disposal. The traditional market for spent hens in food uses has declined since revenue from processing spent hens barely covers the cost of handling the birds, and there are safety concerns of using animal byproduct ingredients in animal diets. Since no viable market is available, spent hens are typically euthanized, composted or buried. Spent hens reach the end of their laying cycle in a physically fragile state, resulting in animal welfare related handling and transportation challenges for the egg industry. Disposal of spent hens in landfills negatively impacts the environment. The poultry industry is currently faced with the challenge of finding methods of utilization which not only minimize nutrient and biohazard emissions into the environment, but also yield residual value to the poultry producer.

In another example, production of protein-rich canola meal is predicted to increase significantly due to the growing needs of bio-energy and bio-products from the crops. Although soybean protein has been extensively studied for this purpose, there has been little progress made with respect to canola protein.

While protein-based adhesives are environmental friendly and are derived from agriculture byproducts which are renewable and more abundant than petroleum resources, currently available protein-based adhesives lack appreciable gluing strength and the water resistance required in adhesive applications. It is desirable to modify protein adhesives to perform a thermosetting function comparable with petroleum-based adhesives.

Therefore, there is a need in the art for converting plant and animal byproducts into useful products.

SUMMARY OF THE INVENTION

The present invention relates to adhesives derived from animal or plant proteins, which may be derived from waste or by-product agricultural streams, such as canola proteins or spent hen proteins.

In one aspect, the invention comprises a method for preparing an adhesive derived from an animal or plant proteins, comprising the steps of:
  a) extracting a protein fraction from an animal or plant product by pH shifting; and
  b) denaturing the extracted protein fraction; or
  c) forming a protein-polymer conjugate with the extracted protein fraction and a polymerizable monomer.

In one embodiment, the animal or plant product is suspended in an alkaline solution, which is then acidified to precipitate the protein.

In one embodiment, the animal product is a spent hen. In one embodiment, step (a) comprises the steps of diluting spent hen meat in water, followed by filtration and centrifugation to obtain a myofibrillar fraction. In one embodiment, the pH of the myofibrillar fraction is adjusted to alkaline, for example about pH 11.0 using sodium hydroxide. The pH of the myofibrillar fraction is then adjusted to acidic. In one embodiment, the pH is adjusted to about pH 5.0 using hydrochloric acid, which precipitates the proteins, which may then be recovered by centrifugation. The protein fraction may be washed by repeated suspensions in deionized water, followed by freeze-drying.

In one embodiment, the plant product is canola or canola meal. In one embodiment, step (a) comprises adjusting the pH of defatted canola meal suspended in water to acidic. In one embodiment, the pH is adjusted to about pH 4.0 using hydrochloric acid. The solution is then centrifuged to obtain a first crude protein precipitate, which is then resuspended in water. The pH of the crude protein suspension is then adjusted to alkaline, preferably about 12.5, followed by centrifugation to remove insoluble non-protein components. The supernatant is then acidified to precipitate a protein fraction, which may be recovered by centrifugation. The protein fraction may be washed by repeated resuspensions in deionized water. In one embodiment, the canola protein is freeze-dried.

In one embodiment, in step (b), the extracted protein is denatured by treatment with a denaturing agent such as sodium hydroxide, urea or sodium dodecyl sulphate. In one embodiment, the denaturing agent comprises urea, in a concentration in the range of about 1 M to about 8 M. In one embodiment, the duration of the treatment is about one to about six hours. In one embodiment, in step (b), the concentration of sodium dodecyl sulfate is in the range of about 0.5% to about 5%.

In one embodiment, the extracted protein is reacted with a polymerizable monomer and initiator to form a protein-polymer conjugate mixture. In one embodiment, the monomer is glycidyl methacrylate. In alternative embodiments, the monomer may comprise butyl methacrylate, hexyl methacrylate, lauryl methacrylate, stearyl methacrylate, 2-ethylhexyl methacrylate, isodecyl methacrylate or other methacrylate with a hydrophobic alkyl group. In one embodiment, the initiator is azonitrile, persulphate or peroxide. In one embodiment, the initiator comprises azobisisobutryonitrile, persulphate, benzoyl peroxide, ammonium persulfate and potassium persulfate. In one embodiment, the protein-polymer conjugate is extracted with a solvent, which solvent may comprise ethanol. In one embodiment, the protein-polymer conjugate is freeze-dried.

In another aspect, the invention comprises an adhesive composition comprising spent hen or canola protein, which protein is either denatured or modified by reaction with a polymerizable monomer.

In yet another aspect, the invention comprises a wood based product comprising pieces of wood based material joined or consolidated with the adhesive described herein. In one embodiment, the wood based material comprises solid wood, fiber, chip, or particleboard material.

Additional aspects and advantages of the present invention will be apparent in view of the description, which follows. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be described by way of an exemplary embodiment with reference to the accompanying simplified, diagrammatic, not-to-scale drawings.

DETAILED DESCRIPTION OF PREFERRED EMBODIMENTS

Figure 1:
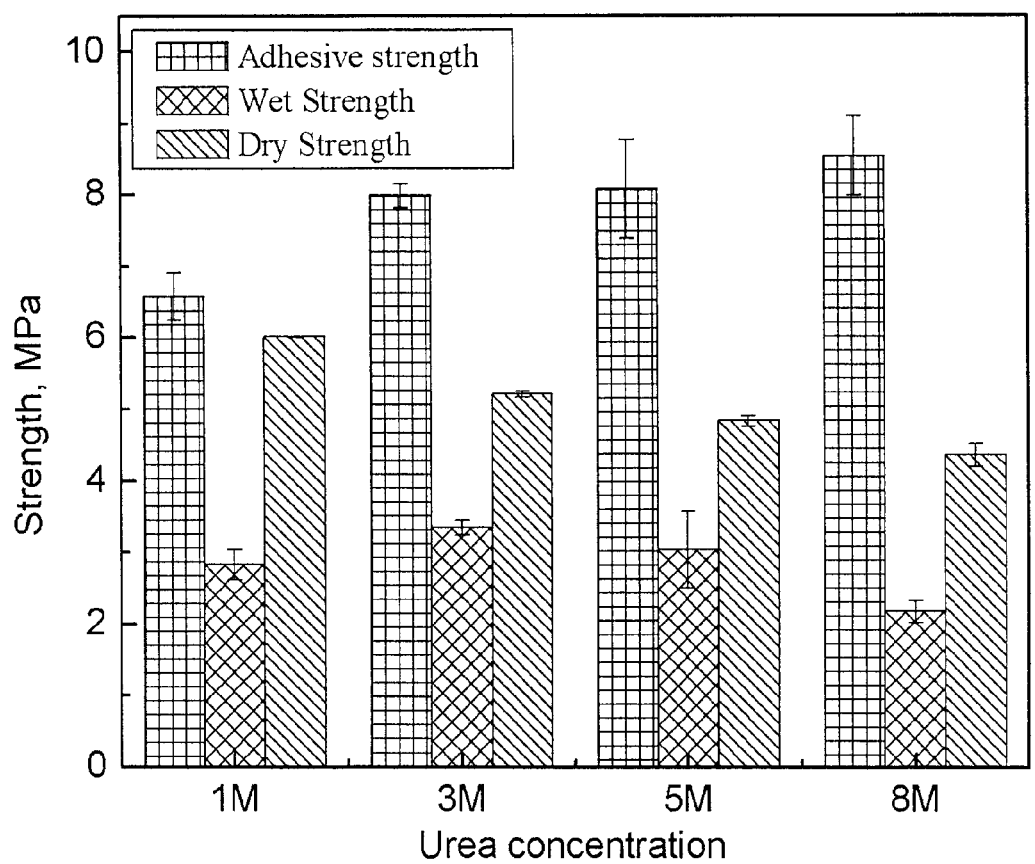
FIG. 1 is a graph showing the effect of urea concentrations on the shear strength of modified spent hen protein.

The present invention relates to protein-based adhesives, and methods for preparing same from plant or animal proteins. When describing the present invention, all terms not defined herein have their common art-recognized meanings. To the extent that the following description is of a specific embodiment or a particular use of the invention, it is intended to be illustrative only, and not limiting of the claimed invention. The following description is intended to cover all alternatives, modifications and equivalents that are included in the spirit and scope of the invention, as defined in the appended claims.

Embodiments of the present invention utilize an agricultural byproduct stream as a source of plant or animal proteins which are modified to form adhesives having desirable physical and chemical properties. In one embodiment, the protein-based adhesive is derived from canola. In one embodiment, the protein-based adhesive is derived from spent hens.

The principle of "protein gluing" is that protein molecules disperse and unfold in solution. The unfolded molecules increase the contact area and adhesion onto other surfaces, and the unfolded molecules become entangled with each other during the curing process to retain bonding strength. Such mechanisms may apply to the adhesion between protein and cellulosic materials, such as wood. Protein and cellulosic material both contain many hydroxyl groups capable of forming hydrogen bonds at the interface or macromolecular interactions between proteins and wood surfaces. When proteins with compacted structures become unfolded in solution, they may more easily form mechanical locking with the rough surface of wood during curing.

In one embodiment, the invention comprises a method for preparing an adhesive derived from animal or plant proteins, comprising the steps of:

a) extracting a protein fraction from an animal or plant product by pH shifting; and b) denaturing the extracted protein fraction; or c) forming a protein-polymer conjugate with the extracted protein fraction and a polymerizable monomer.

The adhesives are produced from plant or animal protein using the methods described herein. The method generally involves at least the steps of extracting protein from an animal or plant product by pH shifting; and modifying the extracted protein by partial or substantial denaturation, or forming a protein-polymer conjugate. The physical properties of the resultant adhesives may be suitable for use in many different applications, such as, for example, as an adhesive material for wood based materials.

In general terms, an animal or plant product containing protein is used as the starting material. In one embodiment, the animal product comprises spent hen carcasses or portions thereof. As used herein, the term "spent hen" means a hen which is normally used for breeding or egg laying, but which is no longer useful, and which would otherwise be discarded. The term includes White Leghorn chickens used in the egg production industry, which typically weigh about 2.5 to 3 pounds and yield relatively small amounts of meat.

In one embodiment, the plant product comprises defatted canola meal, which typically has a protein content of about 30-45% (w/w). As used herein, the term "canola" means a cultivar of either rapeseed (*Brassica napus* L.) or field mustard (*Brassica campestris* L. or *Brassica Rapa* var). As used herein, the term "canola meal" means the residue obtained after the removal of most of the oil from the whole seeds of a species of canola. Canola is an oilseed crop with a high oil content (45-50%) and protein content of 30-45% (w/w) in the defatted meal. Canola ranks as the second largest oilseed crop produced worldwide after soy. As a farm-gate crop with an annual production of 11.8 million tonnes, Canada produces 6.8 million tonnes of meals (Canola Council of Canada 2010 Annual Report).

The protein fraction is extracted from the animal or plant product by pH-shifting. As used herein, the term "pH shifting" means a method of extracting protein from an animal or plant product at alkaline pH, and recovering the protein at acidic pH. Without being bound by any theory, when pH decreases or increases, the proteins are electrically charged, and these charges repel one another. The proteins subsequently unfold and bind more water. When proteins become water soluble, they can be separated from unwanted portions by centrifugation or filtration. After the pH values have been adjusted once more to the point where their solubility has a minimum, the proteins can be collected from the water in a later stage by a second centrifugation or filtration. Preferably, the isolation is performed in chilled conditions to prevent or minimize denaturing of the proteins.

Examples 1 and 2 describes the respective steps for protein extraction from spent hen meat and defatted canola meal. In one embodiment, spent hen meat may be produced by mechanically or manually deboning spent hen carcasses. The meat may then be chopped, pulverized, ground or blended in a size reduction step to a desired consistency, which will facilitate protein extractions. The meat may be suspended in water before or after size reduction. The meat will separate into a top fat layer, a bottom collagen layer, and a middle myofibrillar layer. The myofibrillar layer is removed and adjusted to an alkaline pH. In one embodiment, the pH is adjusted to about pH 11.0 using sodium hydroxide. Following a short incubation at the alkaline pH, during which time proteins are solubilized, the pH is then adjusted to acidic to precipitate the proteins. In one embodiment, the pH is adjusted to about pH 5.0 using hydrochloric acid. The solution is then centrifuged to recover the protein fraction. The protein fraction may be washed by resuspension in deionized water, and which may be freeze-dried for storage and use.

In one embodiment, the extraction of canola protein by pH shifting comprises suspending defatted canola meal in water and adjusting the pH to acidic. In one embodiment, the pH is adjusted to about pH 4.0 using hydrochloric acid. The solution is then centrifuged to obtain a first crude protein precipitate, which is then resuspended in water. The pH of the crude protein suspension is then adjusted to alkaline, preferably about 12.5, to solubilize the desired proteins, followed by centrifugation to remove insoluble non-protein components. The supernatant is then acidified to precipitate a protein fraction, which may be recovered by centrifugation. The protein fraction may be washed by repeated suspensions in deionized water. In one embodiment, the canola protein may be freeze-dried for storage.

The extracted protein fraction may then be modified to form adhesives having desirable physical and chemical properties. In one embodiment, the proteins are modified by partial or substantial denaturation, which has been found to improve their adhesive properties. In one embodiment, the proteins may be treated with a denaturing agent such as NaOH, urea or sodium dodecyl sulfate (SDS) under conditions to denature the proteins. In one embodiment, the denaturing agent comprises urea, which may be used in a concentration in the range of about 1 M to about 8 M. In one embodiment, the duration of the treatment is about one to about six hours. Urea can destabilize globular protein by forming strong hydrogen bonds with the water molecules which surround the protein while interacting actively with hydroxyl groups of the protein to break down the hydrogen bonds, resulting in partially unfolded protein structures.

The effect of the concentration of urea upon the adhesive shear strength of spent hen protein was determined (FIG. 1). As used herein, the term "adhesive strength" means the strength of an adhesive bond, measured as a force required to separate two objects of standard bonded area by either shear or tensile stress. As used herein, the term "shear strength" means the maximum shear stress which a material can withstand without rupture. As used herein, the term "wet strength" means the strength of a material saturated with water. As used herein, the term "soak strength" means the strength of a material after soaking with water. As used herein, the term "dry strength" means the strength of an adhesive joint determined immediately after drying under specified conditions or after a period of conditioning in the standard laboratory atmosphere.

After treatment with urea, the shear strength of the spent hen protein increased. Without being bound by any theory, a cooperative destruction of the tertiary structure occurs at a urea concentration of 1 M, resulting in a mildly denatured state which may still contain a small amount of secondary structures. At a urea concentration of 3-5 M, the denatured state gradually loses its residual secondary structure, and increases the radius of gyration nearly to a maximum value. The polypeptide chain is highly disordered with highly mobile side chains. The unfolding of proteins increases their surface contact area, resulting in higher gluing strength than that of the native protein. Compared with the native protein, some of the hydrophobic amino acids normally buried inside become available on the exterior of the molecule, thus increasing water resistance. Following treatment with urea, the protein fraction is dried.

Figure 2:
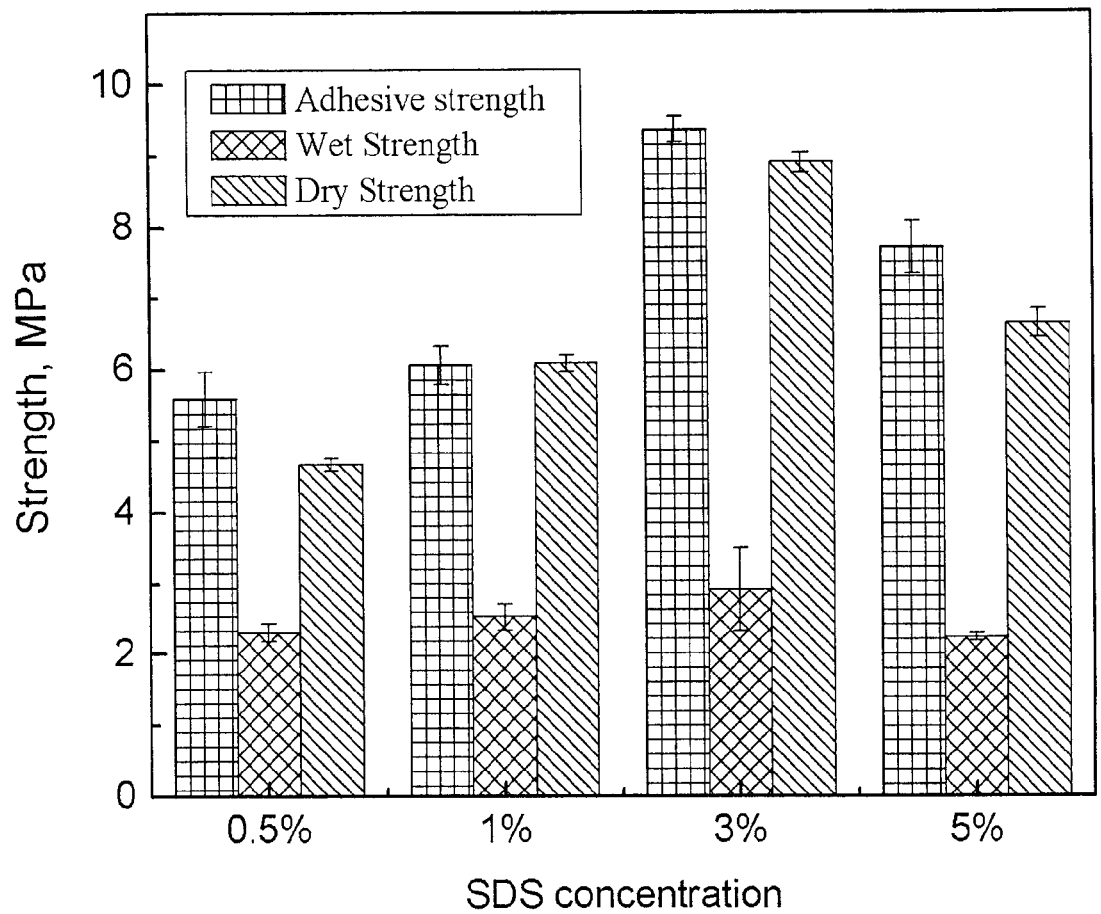
FIG. 2 is a graph showing the effect of sodium dodecyl sulfate concentrations on the shear strength of modified spent hen protein.

In one embodiment, the protein is denatured with SDS. In one embodiment, the concentration of SDS is in the range of about 0.5% to about 5%. SDS is an amphipathic molecule containing a polar group with a long hydrophobic carbon tail, and is commonly used to modify a protein to induce hydrophobic interactions. Without being bound by any theory, the driving force for any degree of unfolding brought about by anion binding may arise from electrostatic repulsion between the charges of the protein, and penetration of the hydrocarbon tail into the polar regions of the protein. Protein can be partly unfolded due to a cooperative conformational change with SDS modification. As shown in FIG. 2, the effect of SDS on the adhesive shear strength of spent hen protein was assessed. Spent hen proteins treated with 3% SDS exhibited the highest gluing strength and water resistance.

In one embodiment, the extracted protein is polymerized to form a protein-polymer conjugate. As used herein, the term "protein-polymer conjugate" means a conjugate comprising a protein and a polymer. In one embodiment, the polymerizing step comprises combining the protein with a reactive monomer and an initiator to form a protein-polymer conjugate-forming mixture. In one embodiment, the monomer is a reactive acrylate monomer, such as glycidyl methacrylate. In alternative embodiments, the monomer may comprise butyl methacrylate, hexyl methacrylate, lauryl methacrylate, stearyl methacrylate, 2-ethylhexyl methacrylate, isodecyl methacrylate or other methacrylate with a hydrophobic alkyl group. In one embodiment, the initiator is azonitrile, persulphate or peroxide. In one embodiment, the initiator comprises azobisisobutryonitrile, persulphate, benzoyl peroxide, ammonium persulfate and potassium persulfate.

In one alternative, the protein extract is first denatured, and then reacted to form a protein-polymer conjugate.

Figure 3:
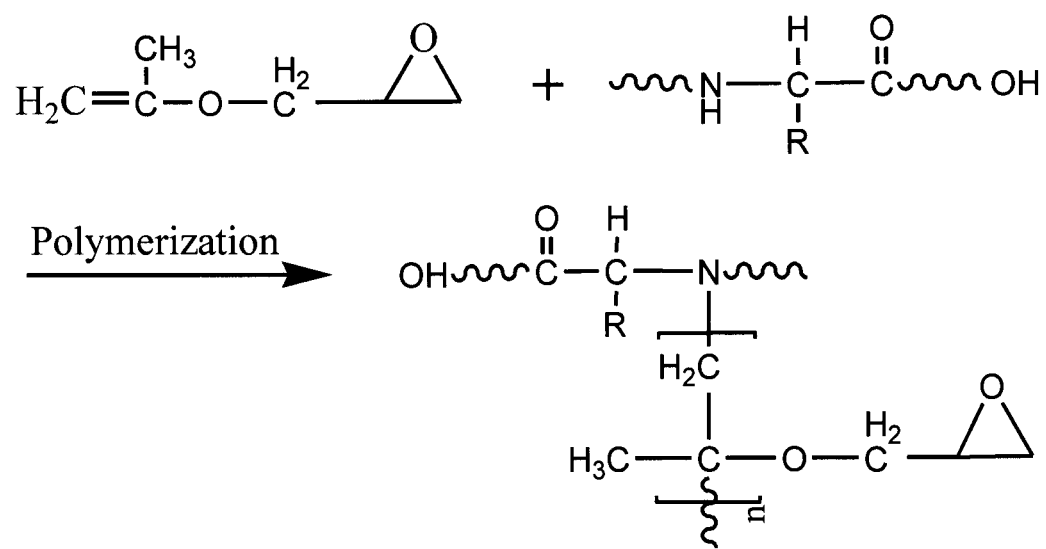
FIG. 3 is a schematic diagram showing a possible reaction between an epoxy group in glycidyl methacrylate polymer and an amide group in canola protein.

Glycidyl methacrylate (GMA) contains both methacrylic and epoxy groups, both of which react readily with a wide range of monomers and functionalized molecules to enable the synthesis of a polymer having desired properties including for example, hydrophobicity (conferred by alkyl chain) and covalent bonding active spot (conferred by epoxies). The reaction between an epoxy group in GMA and an amide group in a canola protein is shown in FIG. 3. Without being bound to any theory, it is believed that grafted GMA chains have functional "gecko foot hairs" which enhance the interaction between the protein and a surface to which it is adhered to. A gecko's ability to climb various surfaces (e.g., wet, dry, smooth, rough) is attributed to micro- or nano-scale high aspect ratio beta-keratin structures. Adhesion is mainly due to molecular forces such as van der Waals force. The polymer chains on the protein surface come into contact with the surface and can induce enough van der Waals forces to hold them in place. The more GMA chains on the protein, the more epoxy groups remain to react with carboxy groups (i.e., —COOH) of wood, improving the bonding strength. During curing, the amine group (i.e., —$NH_2$) reacts with the epoxy groups to crosslink the protein to enhance its water resistance.

In one embodiment, polymerization involves a reaction of GMA monomer and ammonium persulfate with the extracted proteins in an aqueous solution to form a protein-polymer conjugate-forming mixture. The mixture is centrifuged and extracted with a solvent to dissolve the GMA monomer and homopolymers. In one embodiment, the solvent is ethanol. In one embodiment, extraction is conducted for about six hours. The resultant protein-polymer conjugate is freeze-dried. In one embodiment, the protein-polymer conjugate comprises spent hen protein-polymer conjugate. In one embodiment, the protein-polymer conjugate comprises canola protein-polymer conjugate.

The adhesives formed by the above methods may be used for applications including, but not limited to, the bonding or consolidation of wood based materials. As used herein, the term "wood based materials" comprise solid wood, fiber-, chip-, and particleboard materials. In one embodiment, the invention comprises adhesives obtained by the methods described herein. In one embodiment, the invention comprises adhesives in liquid form. In one embodiment, the invention comprises adhesives in powder form. Those skilled in the art will recognize that powder adhesives are usually preferred over liquid adhesives in the structural wood composite market and for molded products, for various reasons including for example, lower press temperatures, shorter press times, longer stabilities, lower transportation costs, and better control over total moisture in a composite panel.

In one embodiment, the invention comprises a wood based product comprising pieces of wood based material joined or consolidated with the adhesive obtained by the above method. In one embodiment, the wood based materials comprise solid wood, fiber-, chip-, and particleboard materials.

The performances of different adhesives were compared, including a commercial adhesive (urea formaldehyde glue); soy protein polymer (DuPont™ soy protein polymer products PC 4200); canola protein denatured by treatment with sodium hydroxide solution (pH=10); and modified canola protein formed by grafting GMA on the protein with a monomer concentration of 0.4 mol/L, reaction time of four hours and curing conditions of 110° C., 60 seconds and 3.5 psi (Table 1).

TABLE 1

Comparison of the adhesion properties of different adhesives

| Adhesive | Dry strength (MPa) | Wet strength (MPa) | Soak strength (MPa) | Toxic |
|---|---|---|---|---|
| Commercial adhesive | 10 | 7 | 9 | Yes |
| Soy protein polymer | 6 | 2 | 4 | No |
| Alkaline denatured canola protein | 5 | 2 | 3 | No |
| Modified canola protein | 9 | 3.5 | 7 | No |

Figure 4:
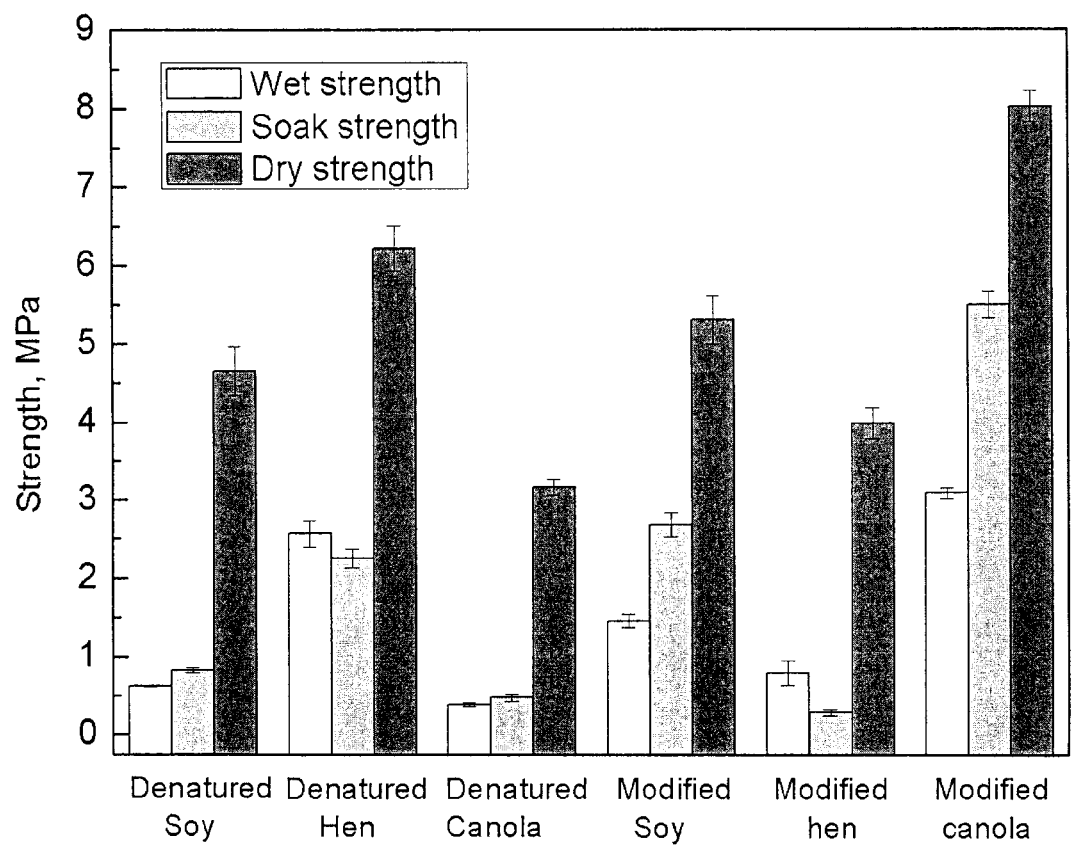
FIG. 4 is a graph showing the adhesion strength of the protein-polymer conjugates compared with the denatured protein.

Both GMA-modified canola protein and GMA-modified spent hen protein exhibited better adhesive performances than those of denatured canola and spent hen proteins (Table 1; FIG. 4). Further, the adhesive performances were comparable or superior than soy protein polymer. Compared to the commercial adhesive, the GMA-modified canola and spent hen proteins are non-toxic.

Figure 5:
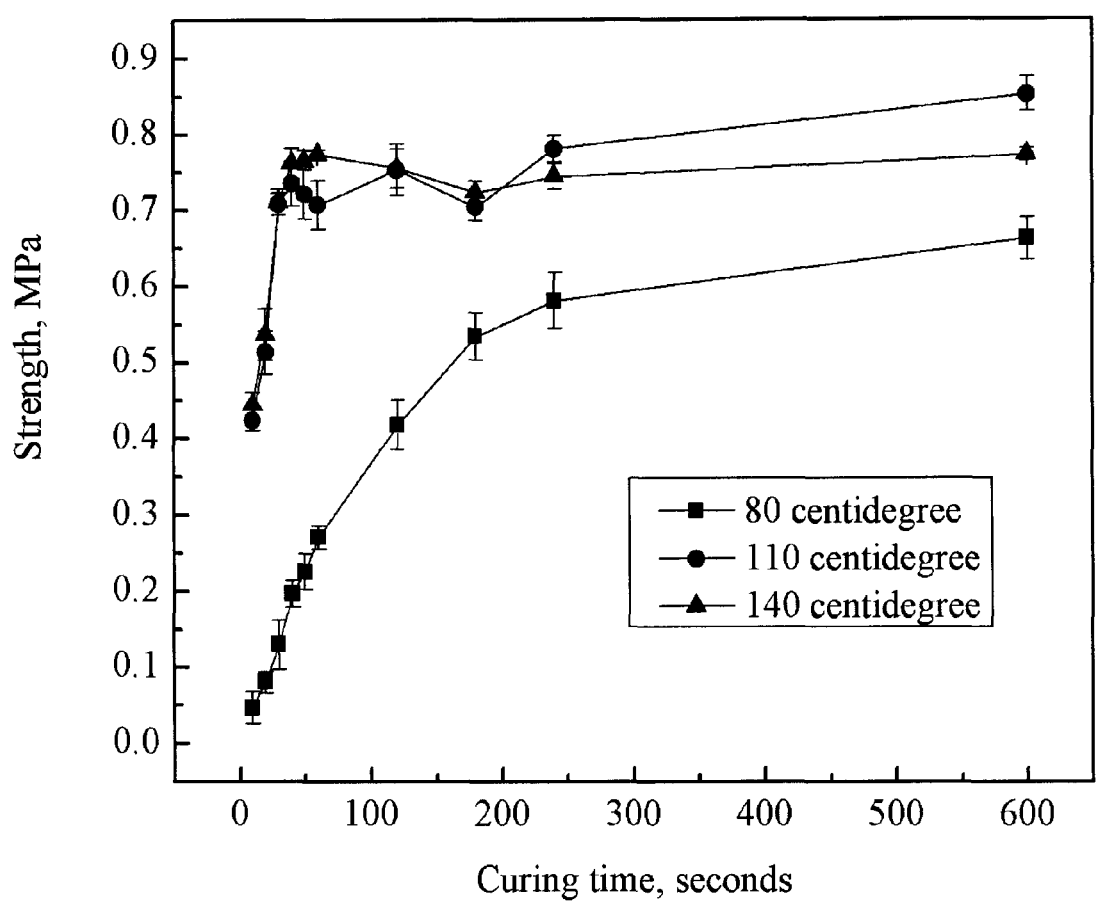
FIG. 5 is a graph showing the effect of curing time at different temperatures on the shear strength of modified canola protein at a curing pressure of 3.1 MPa.

The effect of curing time at different temperatures upon the shear strength of GMA-modified canola protein at a curing pressure of 3.1 MPa was determined (FIG. 5). Without being bound by theory, curing enhances not only immobilization of the protein adhesive but also chemical reactions at the interface between the protein adhesive and substrate. Bonding strength was much higher for the GMA-modified canola protein than that of the denatured protein. The time required for GMA-modified canola protein to reach the maximum curing quality (maximum shear strength) was longer at a lower temperature than at a higher temperature. At a curing temperature of 80° C., the GMA-modified canola protein took about four minutes to reach approximately maximum curing quality. At 110° C., the curing process took about one minute. Compared with the denatured protein, the protein-polymer conjugate performs optimally during a shorter curing time. In one embodiment, curing is conducted at a temperature in the range of about 80° C. to about 140° C. In one embodiment, curing is conducted between about one to about four minutes.

Figure 6:
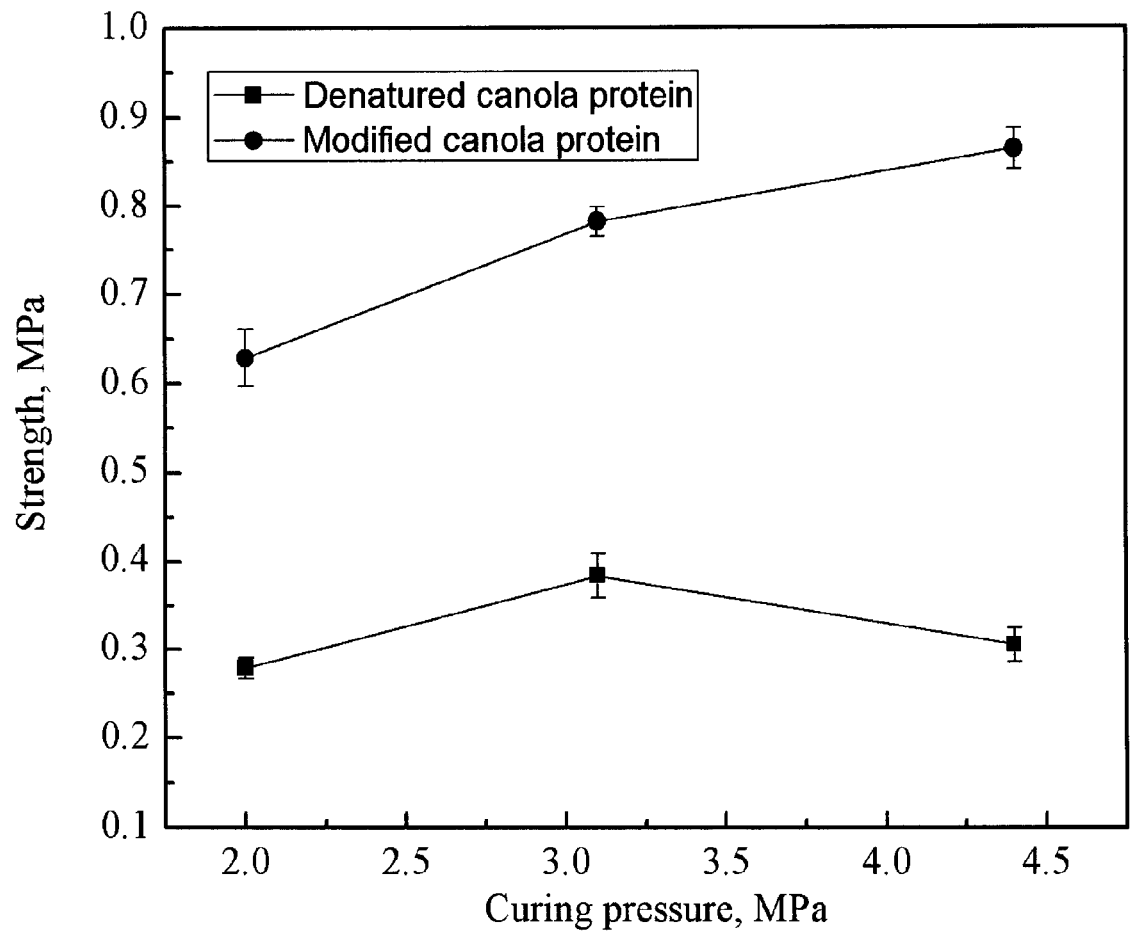
FIG. 6 is a graph showing the effect of curing pressure on the shear strength of denatured and modified canola protein with a curing time of four minutes and a curing temperature of 110° C.

The effect of curing pressure upon the shear strength of denatured and modified canola protein at a curing time of four minutes and a curing temperature of 110° C. was examined (FIG. 6). The GMA-modified canola protein had greater adhesive strength than that of the denatured canola protein at curing pressures in the range of about 2.0 to about 4.5 mPa. Without being bound by any theory, pressure influences protein curing behavior, and consequently, the mechanical properties of the protein adhesive. Pressure during bonding assembly serves several useful purposes by forcing trapped air from the joint, bringing adhesive into molecular contact with the wood surface, forcing adhesive to penetrate into wood structure, squeezing the adhesive into a thin film, and holding the assembly in position while the adhesive cures.

Exemplary embodiments of the present invention are described in the following Examples, which are set forth to aid in the understanding of the invention, and should not be construed to limit in any way the scope of the invention as defined in the claims which follow thereafter.

Example 1

Spent Hen Protein Extraction

For spent hen protein extraction, spent hen meat was blended and mixed with 4 times water [by weight] and stirred for ten minutes. After filtration, the filtrate was centrifuged at 10,000 rpm at 5° C. for twenty-five minutes, resulting in three layers: a fat layer on the top, myofibrillar layer in the middle, and a collagen layer on the bottom. The middle layer was collected and the pH of the solution was adjusted to pH 11.0 with 2 M sodium hydroxide solution. The pH was then adjusted to 5.0 with 1 M hydrochloric acid solution, resulting in precipitation of a protein extract. Spent hen protein was then separated by centrifugation and freeze-dried.

Example 2

Canola Protein Extraction

Defatted canola meal was mixed with water at a ratio of 1:10 (w/v, g/mL, weight of canola meal/volume of water), and the pH of the slurry was adjusted to pH 4.0 using 1 M hydrochloric acid, stirring at 300 rpm for two hours. The slurry was centrifuged at 10,000 rpm at 5° C. for twenty minutes, the precipitate was mixed with the same ratio of water and the pH of the slurry was adjusted to pH 12.5 using 6 M sodium hydroxide, stirring at 300 rpm for one hour. The slurry was centrifuged at 10,000 rpm at 5° C. for twenty minutes. The pH of the supernatant obtained was then adjusted to pH 4.0 with 1 M hydrochloric acid while stirring for thirty minutes, and then was centrifuged at 10,000 rpm at 5° C. for twenty minutes. The precipitate obtained was then washed by suspension in the same volume of deionized water and centrifuged at the same conditions above, repeated for three times. The precipitate was then freeze dried for further uses.

Example 3

Denaturation Modification

Solutions of SDS (0.5% to 5%) and urea (1 M to 8 M) were prepared at room temperature. Freeze-dried canola or spent-hen protein powder (3 g) was suspended in each of a SDS and a urea solution (30 ml), stirred, and reacted for one to six hours. The denatured protein mixture was then dried into powder.

Example 4

Polymerization Method

The graft polymerization of glycidyl methacrylate (GMA) onto protein was carried out in an aqueous solution. First, 2 g of protein powder was dispersed into 50 mL water in a 250 mL round-bottom flask, which was fitted with a magnetic stirrer. The flask was kept in a water bath maintained at 40° C. After purging with nitrogen gas for ten minutes, a calculated amount of GMA monomer and ammonium persulfate (APS) were added into the flask. The APS was added to initiate the graft polymerization. At the end of the reaction, the products were centrifuged at 10000 rpm (Avanti™ J-E Centrifuge, Beckman Coulter, Inc., Mississauga, ON, Canada). The pellet was recovered and products were extracted with ethanol in a Soxhlet extractor for six hours to dissolve all the GMA monomers and homopolymers. The remaining protein-polymer conjugate product was freeze-dried.

Example 4

Wood Specimen Preparation

Hard wood (birch) veneers was used. Prior to testing, the wood veneers were conditioned in a humidity and temperature control chamber (Model 5518, Electro-Tech Systems, Inc., Glenside, Pa., USA) at 50% humidity and 25° C. for seven days. The dimensions of the wood pieces are 0.6× 20×120 mm (thickness, width, and length). Two pieces were glued to form a specimen. The modified protein adhesive slurry was spread onto one end of each two pieces. The applied area on each end was 5×20 mm. The protein content was 1.0 g/ml with a standard deviation of 0.04 g/ml. The two wood pieces with the adhesive were allowed to rest at room temperature for five minutes before they were assembled by hand and then hot-pressed at different conditions. The pressed specimens were cooled and conditioned in the chamber at the same conditions for seven days.

Example 5

Adhesion Strength

Adhesive strength was determined using an automated bonding evaluation system (ABES). The water resistance of adhesive was measured according to ASTM Standard Methods D1151-00. Wood specimens were soaked in tap water at 23° C. for forty-eight hours and tested for wet strength immediately after soaking. The dry strength was assessed after soaked specimens were dried and conditioned at 25° C. and 50% humidity for another seven days.

REFERENCES

The following references are incorporated herein by reference (where permitted) as if reproduced in their entirety. All references are indicative of the level of skill of those skilled in the art to which this invention pertains.

Bonnaffe, D., Lubineau, A., Seris, J. and Therisod, M. Method for the chemical modification of proteins. U.S. Pat. No. 5,262,525, issued Nov. 16, 1993.

Cheng, E., Sun, X. and Karr, G. S. (2004) Adhesive properties of modified soybean flour in wheat straw particleboard. *Composites: Part A* 35 (2004) 297-302.

Ciannamea, E. M., Stefani, P. M. and Ruseckaite, R. A. (2010) Medium-density particleboards from modified rice husks and soybean protein concentrate-based adhesives. *J. Bioresource Tech.* 101:818-825.

Frihart, C. R. and Hunt, C. G. Adhesives with wood materials bond formation and performance. General Technical Report FPL-GTR-190.

Huang, W. and Sun, X. (2000) Adhesive properties of soy proteins modified by sodium dodecyl sulfate and sodium dodecylbenzene sulfonate. *J. Amer. Oil Chem. Soc.* 77:705-708.

Huang, W. and Sun, X. (2000) Adhesive properties of soy proteins modified by urea and guanidine hydrochloride. *J. Amer. Oil Chem. Soc.* 77:101-104.

Konno. T., Kamatari, Y. O., Kataoka, M. and Akasaka, K. (1997) Urea-induced conformational changes in cold- and heat-denatured states of a protein, *Streptomyces* subtilisin inhibitor. *Protein Science* 6:2242-2249.

Krinski, T. L. and Hou, K. C. Soy protein thickener. U.S. Pat. No. 6,291,559, issued Sep. 18, 2001.

Lin, H. and Gunasekaran, S. (2010) Cow blood adhesive: Characterization of physicochemical and adhesion properties. *Int. J. Adhesion and Adhesives* 30:139-144.

Liu, D., Chen, H., Chang, P. R., Wu, Q., Kaifu Li, K. and Guan, L. (2005) Biomimetic soy protein nanocomposites with calcium carbonate crystalline arrays for use as wood adhesive. *Bioresource Tech.* 101:6235-6241.

Liu, Y. and Li, K. (2007) Development and characterization of adhesives from soy protein for bonding wood. *Inter. J Adhesion & Adhesives* 27:59-67.

Liu, W., Mohanty, A. K., Askeland, P., Drzal, L. T. and Misra, M. (2008) Modification of soy protein plastic with functional monomer with reactive extrusion. *J. Polymer Environment* 16:177-182.

Mo, X., Sun, X. and Wang, D. (2004) Thermal properties and adhesion strength of modified soybean storage proteins. *J. Amer. Oil Chem. Soc.* 81:395-400.

Mo, X. and Sun, X. (2000) Thermal and mechanical properties of plastics molded from urea-modified soy protein isolates. *J. Amer. Oil Chem. Soc.* 78:867-872.

Mo, X., Susan, X. and Wang, Y. (1999) Effects of molding temperature and pressure on properties of soy protein polymers. *J. Appl. Polymer Sci.* 73:2595-2602.

Nordqvist, P., Khabbaz. F. and Malmstroma, E. (2010) Comparing bond strength and water resistance of alkali-modified soy protein isolate and wheat gluten adhesives. *Int. J. Adhesion & Adhesives* 30:72-79.

Northen, M. T. and Turner, K. L. (2005) A batch fabricated biomimetic dry adhesive. *Nanotechnology* 16:1159-1166.

Ochi, M., Hori, D., Watanabe, Y., Takashima, H. and Harada, M. (2004) Bonding properties of epoxy resins containing two mesogenic groups. *J. Applied Polymer Science* 92:3721-3729.

Park, S. K., Bae, D. H. and Hettiarachchy, N. S. (2000) Protein concentrate and adhesives from meat and bone meal. *J. Amer. Oil Chem. Soc.* 77:1223-1227.

Pizzi, A. (2006) Recent developments in eco-efficient bio-based adhesives for wood bonding: opportunities and issues. *J. Adhesive Sci. Tech.* 20:829-846.

Riley, R. R. and Coco, C. E. Grafted soy protein latex. U.S. Pat. No. 4,607,089, issued Aug. 19, 1986.

River, B. H., Vick, C. B. and Gillespie, R. H. (1991). Wood as an adherend. In: Minford, J. D. (Ed.), Treatise on Adhesion and Adhesives. Vol. 7. Marcel Dekker, New York.

Sellers, T., Jr., Adhesives in the Wood Industry, in Handbook of Adhesive Technology, edited by A. Pizzi and K. L. Mittal, Marcel Dekker, Inc., New York, 1994, 599-614.

Sleeter, R. T. and Roos, K. D. Co-adhesive system for bonding wood, fibers, or agriculture based composite materials. U.S. Pat. No. 5,942,058, issued Aug. 24, 1999.

Sun, X. and Bian, K. Modified soy protein adhesives. U.S. Pat. No. 6,497,760, issued Dec. 24, 2002.

Sun, S., Wang, D., Zhong, Z. and Yang, G. Adhesives from modified soy protein. U.S. Pat. No. 7,416,598, issued Aug. 26, 2008.

Thames, S. F., Rawlins, J. W., Ferguson, R. C. and Mendon, S. K. Soy protein adhesive and uses thereof. US Patent Application Publication No. 2010/0089287 A1, published Apr. 15, 2010.

Trocino S R, F. S. Vegetable protein adhesive compositions. US Patent Application Publication No. 2003/0148084 A1, published Aug. 7, 2003.

Wescott, J. M. and Frihart, C. R. Water-resistant vegetable protein adhesive dispersion compositions. U.S. Pat. No. 7,345,136, issued Mar. 18, 2008.

What is claimed is:

1. A method for preparing an adhesive derived from animal or plant product, comprising the steps of:
   a) extracting a protein fraction comprising intact proteins from an animal or plant product by pH shifting; and
   b) denaturing the extracted protein fraction or forming a protein-polymer conjugate with the extracted protein fraction and a polymerizable monomer, or both denaturing the extracted protein fraction and forming a conjugate with the denatured protein fraction and a polymerizable monomer.

2. The method of claim 1, wherein the animal product comprises spent hen meat.

3. The method of claim 2, wherein step (a) comprises diluting spent hen meat, followed by filtration and centrifugation to obtain a myofibrillar layer.

4. The method of claim 3, wherein the pH of the myofibrillar layer is adjusted to alkaline.

5. The method of claim 4, wherein a protein fraction is precipitated by adjusting the pH of the myofibrillar layer to an acidic pH following an incubation period at the alkaline pH.

6. The method of claim 5, further comprising the step of centrifuging to recover the precipitated protein fraction, followed by freeze-drying.

7. The method of claim 1, wherein the plant product is canola meal.

8. The method of claim 7, wherein step (a) comprises adjusting the pH of diluted defatted canola meal to acidic.

9. The method of claim 8, wherein the solution is centrifuged to obtain a first precipitate.

10. The method of claim 9, further comprising the step of adjusting the pH of diluted precipitate to alkaline, followed by centrifugation to obtain a supernatant.

11. The method of claim 10, further comprising the step of adjusting the pH of the supernatant to acidic, followed by centrifugation to obtain a second precipitate.

12. The method of claim 11 wherein the second precipitate comprising canola protein is freeze-dried.

13. The method of claim 1, wherein in step (b), the extracted protein fraction is denatured with sodium hydroxide, urea, or sodium hydroxide sulphate.

14. The method of claim 13, wherein the extracted protein fraction is denatured with urea, having a concentration of about 1 M to about 8 M.

15. The method of claim 1, wherein the extracted protein fraction is reacted with a polymerizable monomer to form a protein-polymer conjugate.

16. The method of claim 15, wherein the monomer is glycidyl methacrylate.

17. The method of claim 16, comprising the use of an initiator comprising an azonitrile, a persulphate or a peroxide.

* * * * *